United States Patent [19]

Nakagawa et al.

[11] Patent Number: 4,924,305

[45] Date of Patent: May 8, 1990

[54] MOTION DETECTING CIRCUIT FOR VIDEO SIGNAL PROCESSING USING CORRELATION TECHNIQUES

[75] Inventors: Isao Nakagawa; Sadao Kubota; Toru Suzaki; Toshimitsu Ozawa, all of Yokohama; Masaharu Yao, Kyoto; Hiroshi Ito, Nagaokakyo; Yoshiteru Suzuki, Takatsuki; Tatsuo Shibata, Nagaokakyo, all of Japan

[73] Assignees: Hitachi, Ltd.; Mitsubishi Electric Corporation, both of Tokyo, Japan

[21] Appl. No.: 365,315

[22] Filed: Jun. 13, 1989

[30] Foreign Application Priority Data

Jun. 15, 1988 [JP] Japan .................. 63-145769

[51] Int. Cl.$^5$ .............................................. H04N 5/14
[52] U.S. Cl. .................... 358/105; 358/136; 358/140
[58] Field of Search ............ 358/105, 136, 135, 140, 358/11, 31

[56] References Cited

U.S. PATENT DOCUMENTS 4,626,891 12/1986 Achiha ........................... 358/105 X
4,733,297 3/1988 Katsumata et al. ................. 358/105

FOREIGN PATENT DOCUMENTS 61-70882 4/1986 Japan .
62-154996 7/1987 Japan ........................... 358/105
63-56088 3/1988 Japan .
63-90987 4/1988 Japan .

OTHER PUBLICATIONS

"IDTV and Digital Techniques"; Proceedings at the National Convention of the Institute of Television Engineers of Japan; pp. 49-52; Aug. '86.

Primary Examiner—James J. Groody
Assistant Examiner—Victor R. Kostak
Attorney, Agent, or Firm—Antonelli, Terry, Stout & Kraus

[57] ABSTRACT

A motion detecting circuit is used for a motion-adapted scanning line interpolating circuit in a television system. The motion detecting circuit comprises an inter-frame correlation detecting circuit for detecting and outputting the value of correlation of video signals between adjacent frames, an inter-field correlation detecting circuit for detecting and outputting the value of correlation of signals of corresponding pixels between adjacent fields and an adjusting circuit for adjusting the output of the inter-frame correlation detecting circuit in accordance with the correlation value outputted from the inter-field correlation detecting circuit. An interlace/non-interlace signal converting circuit is also provided with the motion detecting circuit.

18 Claims, 11 Drawing Sheets

MOTION DETECTING CIRCUIT FOR VIDEO SIGNAL PROCESSING USING CORRELATION TECHNIQUES

BACKGROUND OF THE INVENTION

The present invention relates to a circuit for detecting the motion or movement of a picture image, and more particularly to a motion detecting circuit suitable for motion-adapted scanning line interpolation to be made upon interlace-to-sequential (or non-interlace) conversion of scan for a television signal from an interlace scanning to a sequential (or non-interlace) scanning.

An NTSC system for a color television signal is employed at present in Japan, U.S.A., Canada, Korea and Taiwan. The NTSC signal has an interlace structure in which an image for one frame is constructed by images for two fields. Therefore, an interlace induced problem, such as line flicker, has increased conspicuously with the improvement of resolving power of a display. One approach for removing the interlace induced problem by a motion-adapted interlace/non-interlace conversion has been suggested in "IDTV and Digital Techniques", Proceedings of Symposium at the National Convention of The Institute of Television Engineers of Japan, pp. 49 to 52, August 1986. An example of the motion-adapted interlace/non-interlace conversion is shown in FIG. 2. In the figure, an input terminal 19 receives for example, a luminance signal. The inputted luminance signal is delayed by a field memory 20 by 263H (H: one horizontal scanning period) on one hand and delayed by a line memory 21 by 1H on the other hand.

FIG. 3 is a view showing the positions of horizontal scanning lines in fields in an interlace system. In FIG. 3, the abscissa represents the time and the ordinate represents the vertical position (or horizontal scanning line) on a display screen. Now assume that the inputted luminance signal is information for the n-th line. At this time, an output of the line memory 21 is information for the (n−1)th line and an output of the field memory 20 is information for the (n−263)th line. In the case where an image is a still (or stationary) picture image, a non-interlace signal is produced by signal processing in which the (n−263)th line information is interpolated at an intermediate position between the n-th line and the (n−1)th line and information for the (n−526)th line is interpolated at an intermediate position between the (n−263)th line and the (n−264)th line, as shown in FIG. 3. This signal processing is called inter-field interpolation. Namely, in the case of a still picture image, since the correlation of signals between two adjacent fields is very high, a complete image can be reproduced by interpolating a signal in the preceding field between lines in the next field. In the circuit shown in FIG. 2, a non-interlace signal is obtained in such a manner that the interlace signal on the input terminal 19 and the output signal of the field memory 20 are passed through temporal-axis compressors 27 and 28, respectively, and are thereafter outputted through a change-over circuit 29 alternately for every one horizontal scanning period.

An interlace induced problem in the case of the still picture can be removed by the interlace/non-interlace conversion mentioned above. However, in the case of a motion (or moving) picture image faster than a field period, since a deviation of image position exists between adjacent fields, the above-mentioned inter-field interpolation will result in inconveniences such as double image, thereby deteriorating the image quality. For a motion picture image portion, therefore, an interpolation signal is produced by a mean value between information of adjacent upper and lower scanning lines in the same field. This is called in-field interpolation.

In the circuit shown in FIG. 2, an adder 22 produces a mean value between information of upper and lower lines and a signal representative of the mean value is inserted between lines of the interlace signal on the input terminal 19 by the change-over circuit 29. A mixer 23 is provided for mixing an output of the field memory 20 (or an interpolation signal for still picture) and an output of the adder 22 (or an interpolation signal for motion picture). The ratio of mixture of the two interpolation signals to each other is controlled in accordance with the degree (or amount) of a motion. Namely, a large proportion of mixture is given for the output of the adder 22 in the case where the motion is large and for the output of the field memory 20 in the case where the motion is small. Such an interlace/non-interlace conversion in which an interpolation signal is produced in accordance with the motion of a picture image is called a motion-adapted interlace/non-interlace conversion. In general, the detection of the amount of motion for effecting the motion-adapted conversion is made by judging a correlation between frames. Namely, the output signal of the field memory 20 is further delayed by a field memory 24 by 262H. Thus, an output signal of the field memory 24 is information for the (n−525)th line. Accordingly, signals having therebetween a difference equal to one frame are subtracted from each other in a subtracter 25. Since the difference between the signals subtracted from each other is small in the case where those signals have a high correlation therebetween and large in the case where the correlation is low, a motion amount judgement circuit 26 makes the judgement of the presence of a motion when the absolute value of an output of the subtracter 25 is large and makes the judgement of the absence of a motion when it is small. The ratio of mixture of the input signals of the mixer 23 (or the output signal of the field memory 20 and the output signal of the adder 22) to each other is controlled in accordance with the result of judgement by the motion amount judgement circuit 25 to produce an interpolation signal.

The other examples of a motion detecting circuit in a television signal circuit have been disclosed by JP-A No. 61-70882 which was filed in Japan by Sony Corporation on Sept. 14, 1986 and laid open on Apr. 11, 1986, JP-A No. 63-56088 which was filed in Japan by Victor Company of Japan Ltd. on Aug. 26, 1986 and laid open on Mar. 10, 1988, and JP-A No. 63-90987 which was filed in Japan by Hitachi Ltd. et al on Oct. 6, 1986 and laid open on Apr. 21, 1988.

The above-mentioned techniques have one problem when a video signal representative of a finely defined image having a resolution close to a critical vertical resolution (525 TV lines) is to be reproduced. Consider the case where a signal having a resolution close to the critical vertical resolution involves a minute motion (for example, the case where an image involves a minute upward and downward motion caused by the vibration of a camera). If such a case is judged as being a motion picture and hence an in-field (inter-line) interpolation is carried out, an image for a signal portion close to the critical vertical resolution will strongly flicker, thereby deteriorating the image quality.

For example, in the case of a large-amplitude signal (525 horizontal lines for black and white) having a critical vertical resolution, as shown in FIG. 4A, the preceding field (for example, (n−263)th line, (n−262)th line, etc.) involves white information and the current field (for example, (n−1)th line, n-th line, (n+1)th line, etc.) involves black information. If an inter-field interpolation for a still picture is carried out, the signal having the critical vertical resolution in which the successive lines include alternately white information and black information, can be accurately reproduced for any field, as shown in FIG. 4B. On the other hand, if an in-field interpolation for a motion picture is carried out, the preceding field provides a signal in which all the lines involve white information as shown in FIG. 4C while the current field provides a signal in which all the lines involve black information as shown in FIG. 4D. As a result a strong flicker appears between fields. Namely, black and white appear on the image screen alternately for every one field period.

Thus, there is a problem that the interpolation processing (or in-field interpolation) for a motion picture having a resolution close to the critical resolution may cause flicker.

When a camera involves a minute vibration in the vertical direction, even a slight positional deviation between scanning lines (for example, in order of one third) produces a considerably large difference between frames, as is apparent from FIG. 5A. Accordingly, if the ratio of the in-field interpolation to the inter-field interpolation is made large under the judgement as a motion picture involving a large motion, the above-mentioned flicker between fields occurs, thereby remarkably deteriorating the image quality. Conversely, if the inter-field interpolation is applied to all cases inclusive of the above-mentioned case where the difference between frames is large, there results in practically intolerable image deterioration such as double image when a usual small-amplitude signal representative of an image having a resolution lower than the critical vertical resolution involves a motion.

SUMMARY OF THE INVENTION

An object of the present invention is to provide means by which the flicker of a signal having a resolution close to the critical vertical resolution can be greatly reduced without producing any image deterioration such as the above-mentioned double image in the case of a usual motion picture image.

The above object can be achieved by changing the sensitivity of detection of a correlation between frames (or an inter-frame correlation) in accordance with the value of a correlation between fields (or an inter-field correlation). Namely, the present invention utilizes a phenomenon that a signal having the critical vertical resolution or a resolution close thereto provides a low correlation between fields (or a large difference between fields) as shown in FIG. 5A while a usual signal having an intermediate or low resolution provides a high correlation between fields (or a small difference between fields) as shown in FIG. 5B when a small motion is involved.

The correlation between fields can be detected by detecting a difference between lines which are close or adjacent to each other between adjacent fields. For example, if a difference between the signal of the n-th line and the signal of (n−263)th line in FIG. 4A is determined, a large difference between fields is outputted since the correlation between fields is small, for example, in the case where there is a signal having a resolution close to the critical resolution as shown in FIG. 4A or the case where a large-amplitude motion picture image is included. When such a large difference between fields is detected, the output of the motion amount judgement circuit 26 is controlled so as to make small the ratio of the output of the adder 22 (or the in-field interpolation signal) to the output of the field memory 20 in the mixer 23. Namely, the output of the motion amount judgement circuit is not uniquely determined by a difference between frames (or a correlation between frames) but the output characteristic (or sensitivity characteristic) of the motion amount judgement circuit is changed in accordance with the value of a correlation between fields (or a difference between fields). Thereby, in the case of a large-amplitude signal having a resolution close to the critical vertical resolution, even a minute motion is judged as being a still picture image since the motion detection sensitivity is low. Accordingly, an interfield interpolation is made, thereby greatly reducing the flicker. On the other hand, in the case of a motion picture, that is, in the case where a large-amplitude signal involves a large motion, erroneous judgement as a still picture image is not made since a sufficiently large difference between frames is produced. Also, in the case of a small-amplitude signal, the motion detection sensitivity is high since only a small difference between fields is produced. Therefore, even if the small-amplitude signal involves a large motion, it becomes possible to surely detect the motion.

DESCRIPTION OF THE PREFERRED EMBODIMENTS

Figure 1:
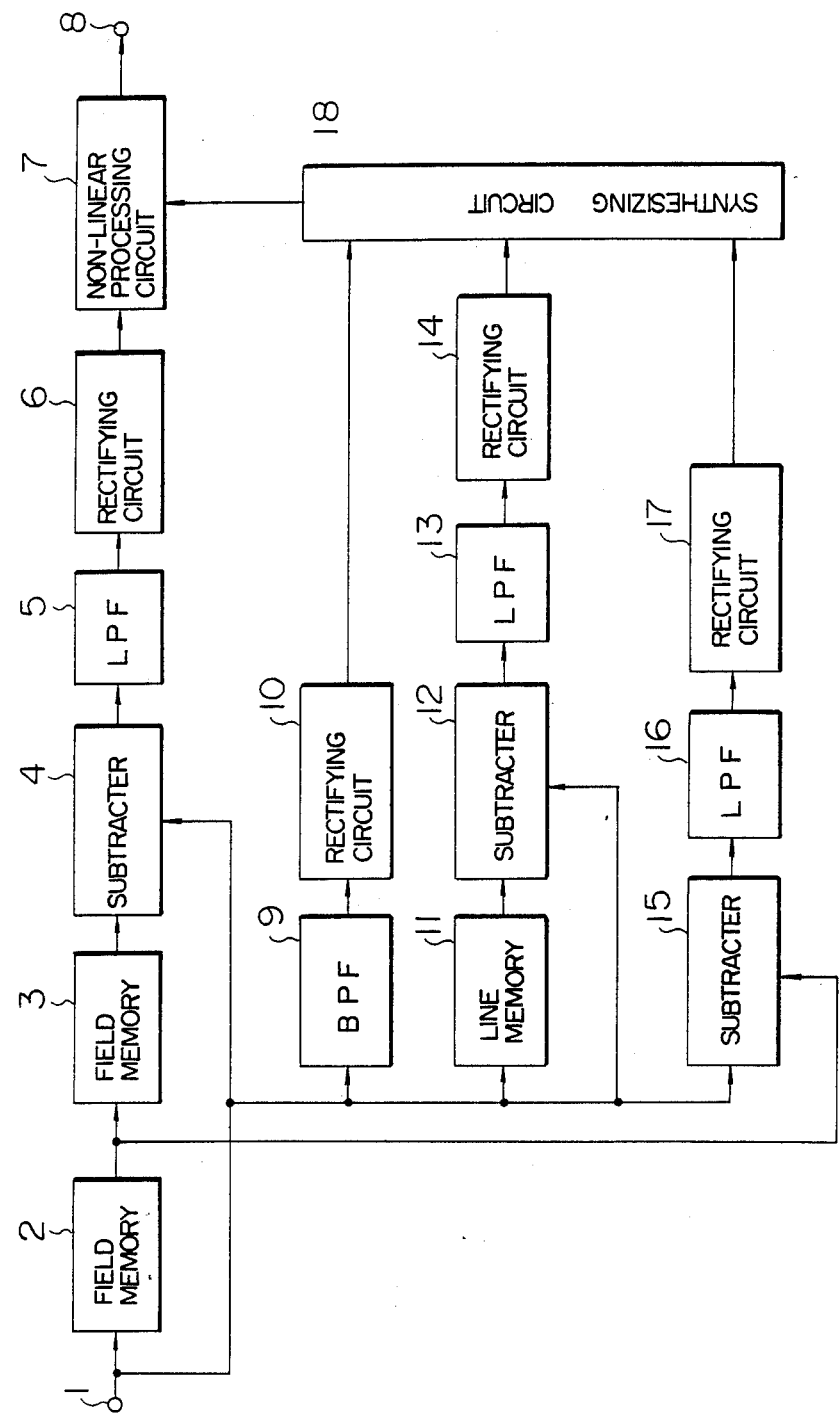
FIG. 1 is a block diagram of an embodiment of a motion detecting circuit according to the present invention.

An embodiment of a motion detecting circuit according to the present invention now be explained by virtue of FIG. 1. In the figure, reference numeral 1 designates an input terminal, numeral 2 a first field memory for delaying an input signal by 263H, numeral 3 a second field memory for further delaying an output of the first field memory 2 by 262H, numeral 4 a first subtracter for subtracting the input signal from the input terminal 1 and an output signal of the second field memory 3 from each other, numeral 5 a low pass filter (LPF) for removing a high frequency component from an output of the first subtracter 4, numeral 6 a first rectifying circuit for determining the absolute value (or amplitude) of an output signal of the first LPF 5, numeral 7 a non-linear processing circuit for non-linearly processing an output of the first rectifying circuit 6 to deliver the non-linearized output as the amount of a motion, numeral 8 an output terminal, numeral 9 a band pass filter (BPF) for detecting a signal representative of the outline (or the amount of change in amplitude) of the input signal on the input terminal 1 in a horizontal direction, numeral 10 a second rectifying circuit for determining the absolute value of an output signal of the BPF 9, numeral 11 a line memory for delaying the input signal from the input terminal 1 by 1H, numeral 12 a second subtracter for subtracting an output of the line memory 11 and an input thereof from each other, numeral 13 a second LPF for removing a high frequency component from an output of the second subtracter 12, numeral 14 a third rectifying circuit for determining the absolute value of an output signal of the second LPF 13, numeral 15 a third subtracter for determining a difference between the input signal of the first field memory 2 and the output signal thereof, numeral 16 a third LPF for removing a high frequency component from an output signal of the third subtracter 15, numeral 17 a fourth rectifying circuit for determining the absolute value of an output signal of the third LPF, and numeral 18 a synthesizing circuit for producing a control signal for the non-linear processing circuit 7 on the basis of input signals supplied to the synthesizing circuit from the second, third and fourth rectifying circuits 10, 14 and 17.

The first subtracter 4 outputs a signal representative of a difference between frames (or an inter-frame difference signal). This inter-frame difference signal includes a color subcarrier component. The color subcarrier component is removed by the first LPF 5 and the difference signal including no color subcarrier component is inputted to the first rectifying circuit 6. Therefore, first rectifying circuit 6 determines and outputs the absolute value of the first LPF 5. As a result, a correlation between frames for a low frequency signal component is determined. On the other hand, the BPF 9 outputs a signal representative of an outline component including no color subcarrier which in turn is inputted to the second rectifying circuit 10. Therefore, the second rectifying circuit 10 outputs a signal conformable to the amount of change of amplitude in a horizontal direction. The second subtracter 12 outputs a signal representative of a difference between lines (or an inter-line difference signal) which includes a color subcarrier component. The color subcarrier component is removed by the second LPF 13 and the inter-line difference signal including no color subcarrier component is inputted to the third rectifying circuit 14. Accordingly, the third rectifying circuit 14 outputs a signal representative of the amount of change of amplitude in a vertical direction. Further, the third subtracter 15 outputs a signal representative of a difference between fields separated by 263H (or an inter-field difference signal) and the difference signal is inputted to the third LPF 16. A color subcarrier component included in the inter-field difference signal is removed by the third LPF 16 and the difference signal including no color subcarrier component is inputted to the fourth rectifying circuit 17. Accordingly, the fourth rectifying circuit 17 outputs a signal representative of the amount of change of amplitude between the signals separated by 263H, that is, a signal representative of a correlation between fields (or an inter-field correlation signal).

A circuit portion for detecting the outline signal for the horizontal direction which circuit portion consists of the BPF 9 and the rectifying circuit 10 and a circuit portion for detecting the in-field (or inter-line) correlation signal which circuit portion consists of the line memory 11, the subtracter 12, the LPF 13 and the rectifying circuit 14, are not essential to the motion detecting circuit of the present invention. However, in order to solve the problems of flicker and double image under practically proper conditions, it is preferable to use those circuit portions.

Figure 6:
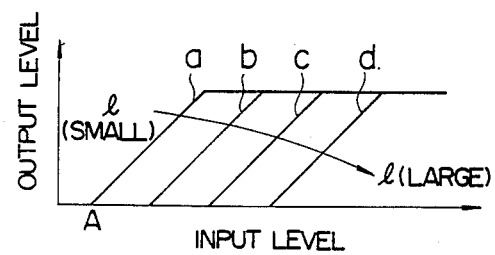
FIG. 6 is a view showing the characteristic of a non-linear processing circuit in the present invention.

The synthesizing circuit 18 produces a control signal which controls the input/output characteristic of the non-linear processing circuit 7 in accordance with the outputs of the second, third and fourth rectifying circuits 10, 14 and 17. The characteristic of the non-linear processing circuit 7 exhibits such a control characteristic as shown by way of example in FIG. 6. For example, when the level 1 of the output signal from the synthesizing circuit 18 is the minimum, the non-linear processing circuit 7 exhibits an input/output characteristic indicated by a in FIG. 6. Namely, until the input signal level of the non-linear processing circuit 7 (or the level of the input signal supplied from the first rectifying circuit 6) takes a value of A, the output signal level of the non-linear processing circuit 7 is zero (that is, the correlation is high and the amount of motion is zero). As the input signal level becomes larger than A, the output level of the non-linear processing circuit 7 gradually increases (that is, the correlation becomes gradually low and the amount of motion becomes gradually large) and is ultimately saturated. As the level 1 of the output signal from the synthesizing circuit 18 becomes large, the threshold value A of the non-linear processing circuit 7 (or the input signal level at which the output signal level rises from zero) becomes gradually large as indicated by b, c and d in FIG. 6. Namely, the judgement of the presence of a motion is not made unless a large level signal (or a large inter-frame difference signal) is inputted to the non-linear processing circuit 7 as the output signal level of the synthesizing circuit 18 becomes large.

Figure 7:
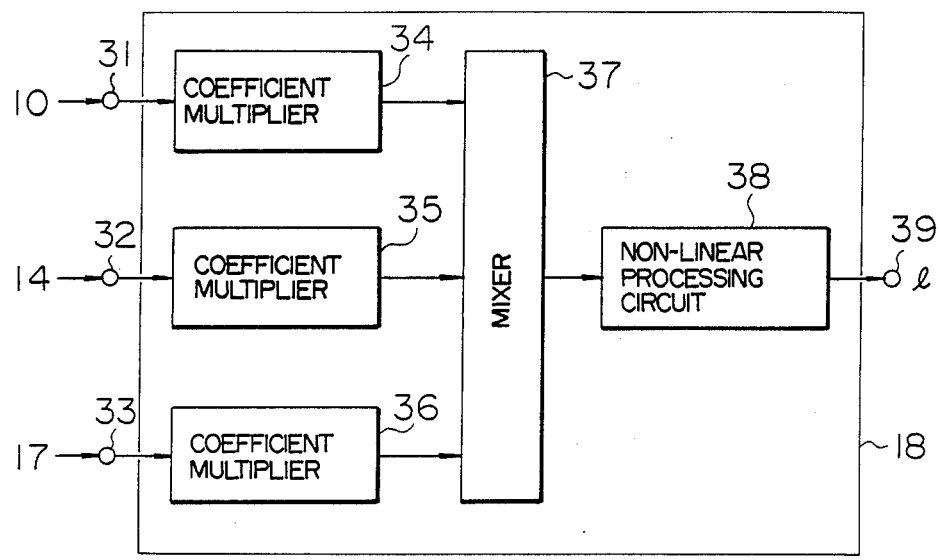
FIG. 7 is a block diagram showing the construction of an embodiment of a synthesizing circuit in the present invention.

If the output of the non-linear processing circuit 7 is supplied to, for example, the mixer 23 shown in FIG. 7 to control the ratio of the output of the field memory 20 to the output of the adder 22, the flicker and double image can be reduced for either a signal having the critical vertical resolution or a usual signal.

Figure 8:
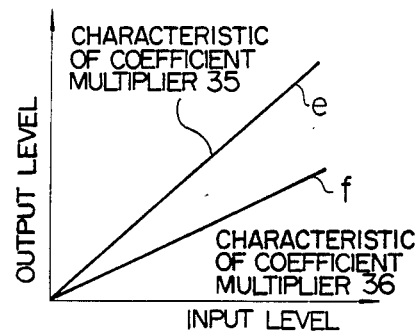
FIGS. 8 and 9 are views showing the characteristics in the synthesizing circuit shown in FIG. 7.
Figure 9:
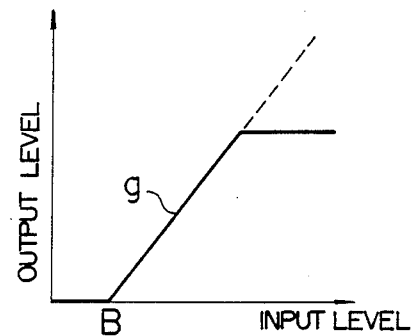

The synthesizing circuit 18 which controls the non-linear processing circuit 7 may be designed to produce a large output when the output of either one of the three rectifying circuits 10, 14 and 17 mentioned above is large. An embodiment of the synthesizing circuit 18 is shown in FIG. 7. In the figure, reference numerals 31, 32 and 33 designate input terminals of the synthesizing circuit 18 to which the output signals of the rectifying circuits 10, 14 and 17 are inputted respectively. Numerals 34, 35 and 36 designate coefficient multipliers each of which adjusts the gain of the inputted signal. Numeral 37 designates a mixer for mixing the outputs of the coefficient multipliers 34, 35 and 36, numeral 38 a non-linear processing circuit for subjecting an output of the mixer 37 to nonlinear processing, and numeral 39 an output terminal of the synthesizing circuit 18. Each of the three coefficient multipliers 34, 35 and 36 is provided for changing the gain of a signal inputted thereto. For example, in the case where it is desired to suppress the deterioration of the image quality such as double image as greatly as possible even if minor flicker in the vicinity of the critical vertical resolution may be accepted, the gains of the coefficient multipliers 34, 35 and 36 are set such that the gain of an input/output characteristic f of the coefficient multiplier 36 is lower than that of an input/output characteristic e of the coefficient multiplier 35, as shown in FIG. 8. In contrast, in the case where the flicker should be suppressed as greatly as possible even if minor double image may be accepted, the gain of the input/output characteristic of the coefficient multiplier 36 is made higher than that of the input/output characteristic of the coefficient multiplier 35. The mixer 37 mixes three input signals thereof into one signal by use of adder means or maximum value selection means. The non-linear processing circuit 38 is designed to provide a non-linear characteristic q as shown in FIG. 9 by way of example. Referring to FIG. 9, no signal is outputted at a portion where the input level is lower than the threshold value B. This means that the control characteristic of the non-linear processing circuit 7 shown in FIG. 1 is prevented from changing due to, for example, very small noises. A portion where the characteristic is saturated as shown in FIG. 9, is provided for reducing the number of signal lines by causing the synthesizing circuit 18 to generate a control signal with the number of bits necessary for the number of variable control stages of the non-linear processing circuit 7 of FIG. 7. In the case of digital control, the non-linear processing circuit 7 produces the motion amount detection output in a form of values which are not continuous but appear as discrete steps. For example, the output 1 is delivered in units of ⅛ over a region from 0 (still picture) to 1 (largest motion). The number of the stepwise discrete values is the above-mentioned number of variable control stages. Since it is not necessary to make the number of bits greater than the stepwise discrete values, the output (see FIG. 9) of the non-linear processing circuit 38 has a portion where it is saturated.

Figure 10:
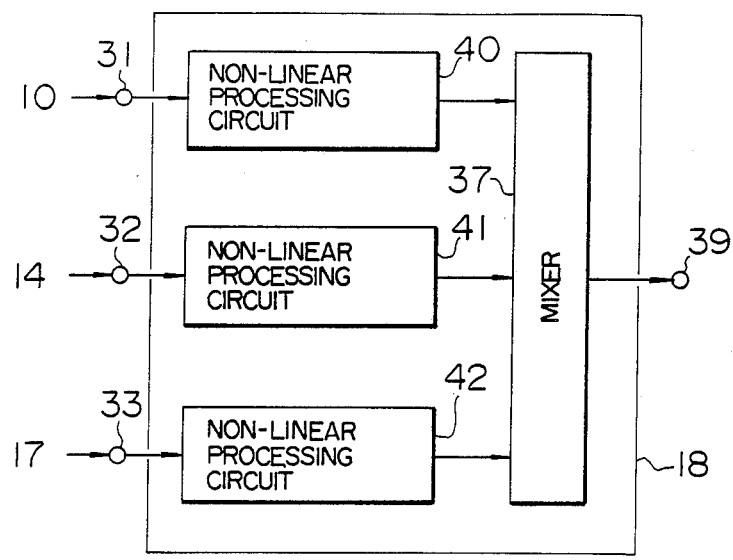
FIG. 10 is a block diagram showing the construction of another embodiment of a synthesizing circuit in the present invention.
Figure 11:
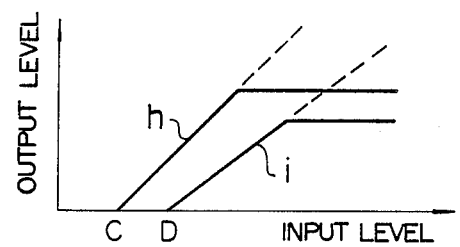
FIG. 11 is a view showing the characteristic in the synthesizing circuit shown in FIG. 10.

FIG. 10 shows another embodiment of the synthesizing circuit 18. In FIG. 10, reference numerals 40, 41 and 42 designate non-linear processing circuits for non-linearly processing input signals supplied from input terminals 31, 32 and 33, respectively. Each of the non-linear processing circuits 40, 41 and 42 has a characteristic as shown in FIG. 8. With the construction shown in FIG. 10, the input signals supplied to the input terminals 31, 32 and 33 are subjected to nonlinear processing and are applied with the reduced number of bits to a mixer 37. Thereby, the circuit construction of the mixer 37 can be simplified. Also, if the non-linear processing circuits 41 and 42 are designed to has characteristics h and i respectively as shown in FIG. 11, there is obtained an effect equivalent to the effect provided in the case where the characteristics of the coefficient multipliers 35 and 36 are made different from each other as shown in FIG. 8. Though the characteristics h and i of the non-linear processing circuits 41 and 42 shown in FIG. 11 differ from each other in all of rise point (C, D), gradient and saturation level, it is of course that a desired effect such as the reduction of flicker or the reduction of double image can be obtained by changing either one of the rise point, gradient and saturation level or two thereof in combination.

Figure 12:
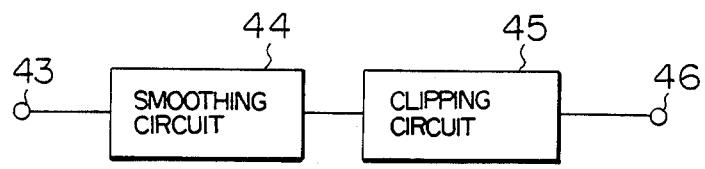
FIG. 12 is a block diagram of a circuit which is to be added to the circuit of the embodiment shown in FIG. 1.

In the case of a complicated image, the output value of each of the rectifying circuits 10 and 18 greatly changes for each pixel. Therefore, if the output of the synthesizing circuit 18 is inputted to the non-linear processing circuit 7 as it is, a reproduced image exhibits an unnatural appearance since the output of the non-linear processing circuit 7 frequently changes so that, in some cases, quite different interpolation processings are carried out for adjacent pixels. In order to avoid such an inconvenience or to prevent the output of the non-linear processing circuit 7 of FIG. 1 from abruptly changing between pixels adjacent or close to each other, a circuit as shown in FIG. 12 may be interposed between the synthesizing circuit 18 and the non-linear processing circuit 7 in the embodiment shown in FIG. 1. In FIG. 12, reference numeral 43 designates an input terminal, numeral 44 a smoothing circuit, numeral 45 a clipping circuit, and numeral 46 an output terminal. The output signal of the synthesizing circuit 18 is inputted from the input terminal 43 to the smoothing circuit 44. The smoothing circuit 44 may be an LPF. The signal inputted to the smoothing circuit 44 is converted to a smooth signal. If necessary, the number of bits is reduced by the clipping circuit 45 provided for further reducing the number of bits. An output signal of the clipping circuit 45 is supplied to the non-linear processing circuit 7 of FIG. 1 to control the same.

Figure 13:
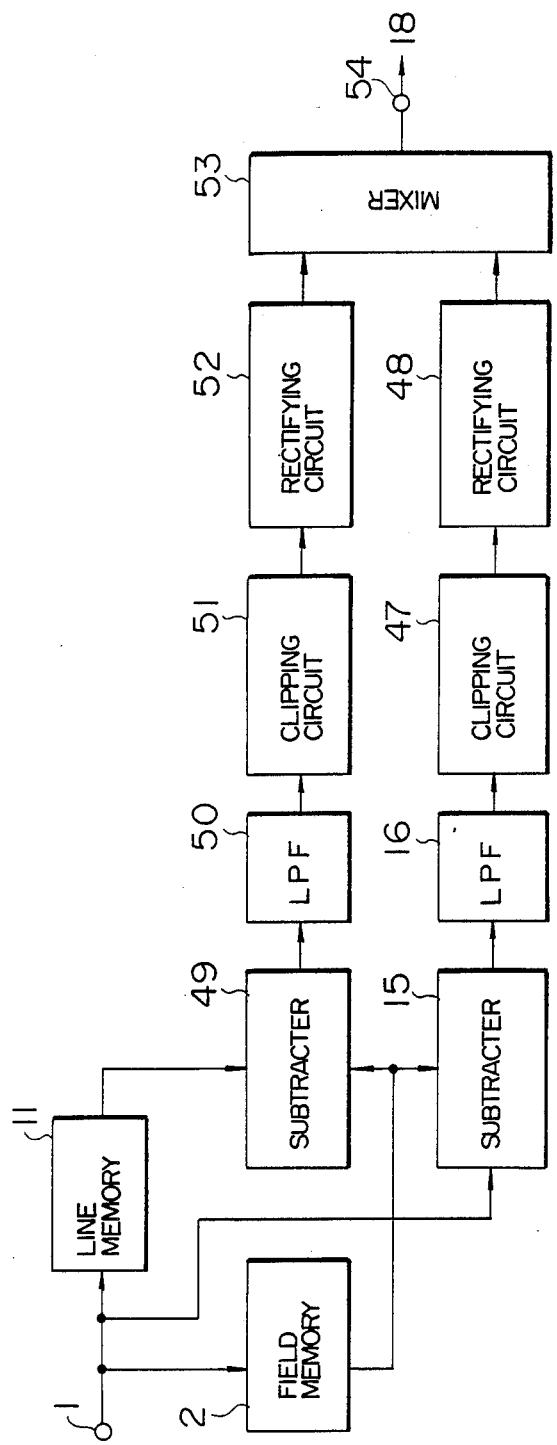
FIG. 13 is a block diagram of an embodiment of an inter-field correlation detecting circuit portion in the present invention.

The embodiment shown in FIG. 1 has been explained in conjunction with the case where the interfield correlation is determined using information for one scanning line in each of adjacent fields. Alternatively, the inter-field correlation can be determined using information for a plurality of scanning lines in either one or each of the adjacent fields. In this case, the precision of detection can be improved. A circuit for determining the inter-field correlation in such a case is shown in FIG. 13. In the figure, reference numeral 47 designates a clipping circuit for clipping the output signal of the LPF 16, numeral 48 a rectifying circuit for determining the absolute value of an output signal of the clipping circuit 47, numeral 49 a subtracter for determining a difference between a signal preceding by 1H and a signal preceding by 262H, numeral 50 a LPF for removing a color subcarrier component from an output signal of the subtracter 49, numeral 51 a clipping circuit for clipping an output signal of the LPF 50, numeral 52 a rectifying circuit for determining the absolute value of an output signal of the clipping circuit 51, numeral 53 a mixer for mixing an output signal of the rectifying circuit 52 and an output signal of the rectifying circuit 48, and numeral 54 an output terminal.

Figure 3:
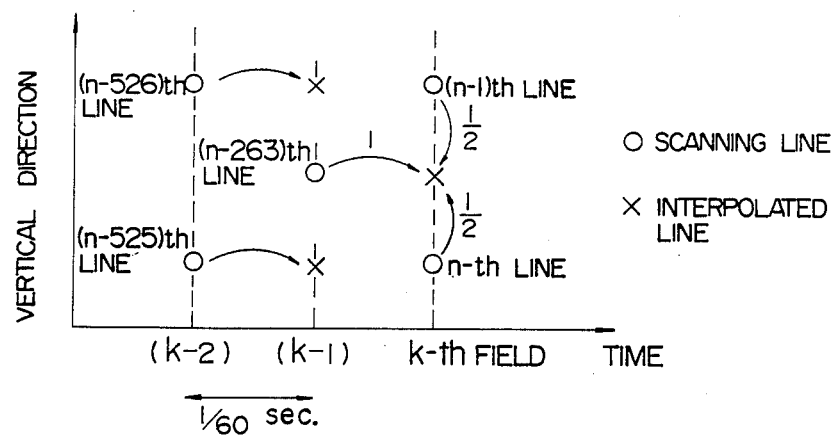
FIG. 3 is a view for explaining the operation of an inter-field interpolation and the operation of an in-field interporation.
Figure 4A:
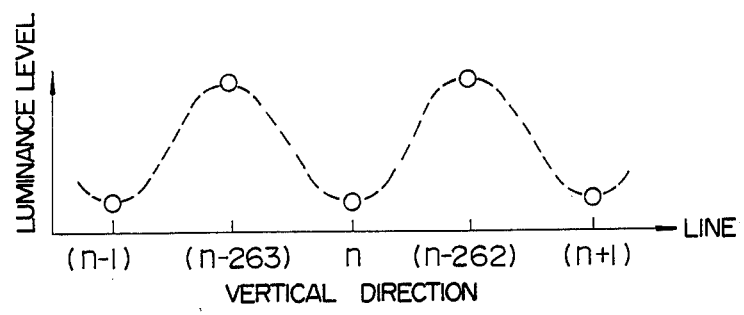
FIGS. 4A to 4D are views for explaining the flicker of a signal having a critical vertical resolution.
Figure 4B:
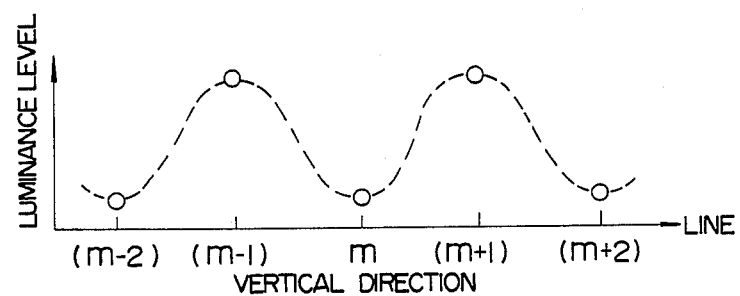
Figure 4C:
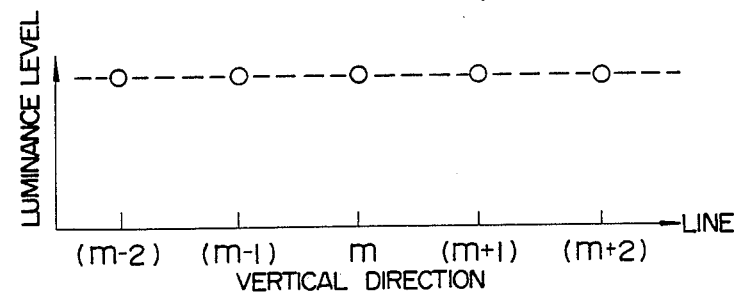
Figure 4D:
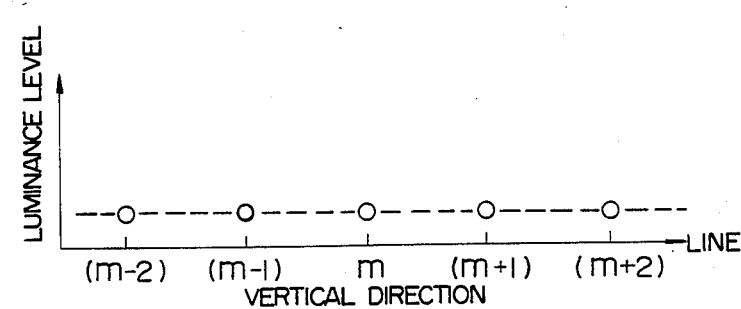
Figure 5A:
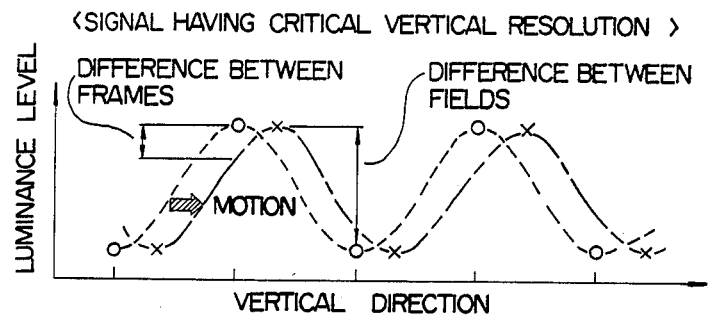
FIGS. 5A and 5B are views for comparatively explaining a difference between fields for a signal having a critical vertical resolution and a difference between fields for a signal having an intermediate or low resolution.
Figure 5B:
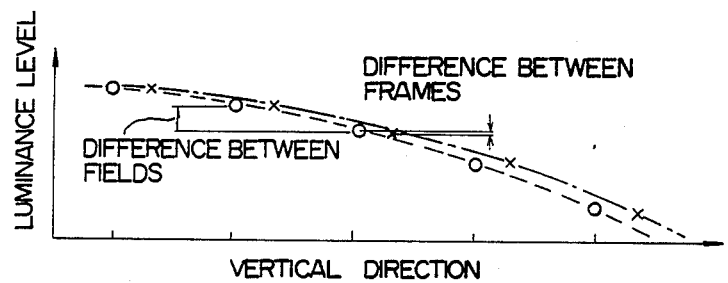

The two clipping circuits 51 and 47 used in FIG. 13 are provided for reducing the numbers of bits of the output signals of the LPF's 50 and 16, respectively. Thereby, the number of exclusive OR circuits necessary for respective bits when a signal is digitally rectified in each of the rectifying circuits 48 and 52, can be conveniently reduced. The rectifying circuit 48 outputs a signal representative of a correlation between the n-th line and the (n−263)th line in FIG. 3 while the rectifying circuit 52 outputs a signal representative of a correlation between the (n−1)th line and the (n−263)th line. The mixer 53 synthesizes the two inter-field correlation signals through addition thereof or maximum value selection. An output signal of the mixer 53 supplied to the output terminal 54 is inputted in place of the output signal of the fourth rectifying circuit 17 of FIG. 1 to the synthesizing circuit 18 of FIG. 1.

Figure 14:
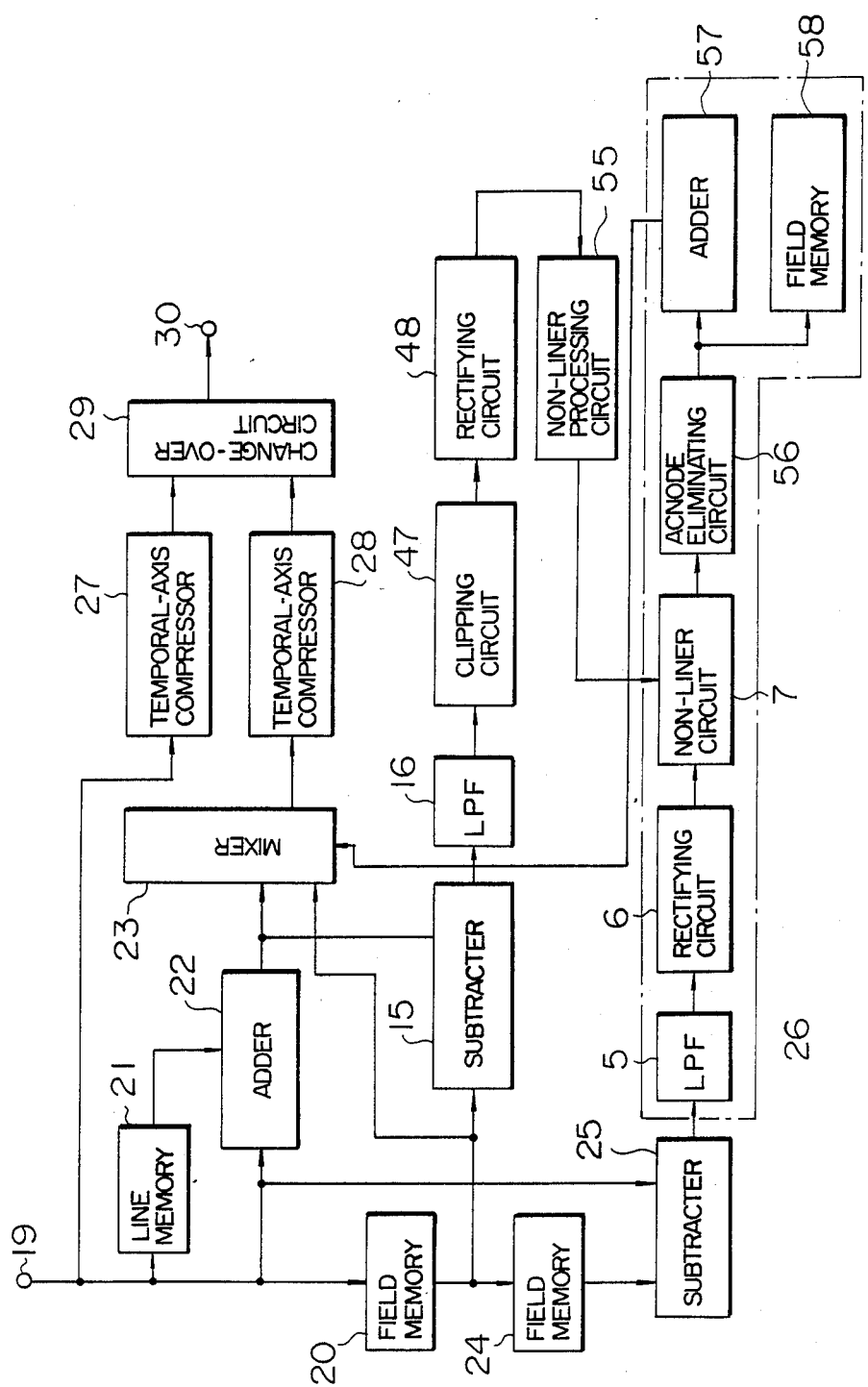
FIG. 14 is a block diagram of an embodiment of an interlace/non-interlace signal converting circuit according to the present invention.

An embodiment of a motion-adapted interlace/non-interlace signal converting circuit is shown in FIG. 14. Though the circuit shown in FIG. 14 is one in which the motion detecting circuit shown in FIG. 1 is applied to the interlace/non-interlace signal converting circuit shown in FIG. 2, the components 9, 10, 11, 12, 13 and 14 in FIG. 1 are omitted. In FIG. 14, components 19 to 25 and 27 to 30 are the same as those shown in FIG. 2, components 5 to 7, 15 and 16 are the same as those shown in FIG. 1, and components 47 and 48 are the same as those shown in FIG. 13. Reference numeral 55 designates a non-linear processing circuit for non-linearly processing an output of the rectifying circuit 48, numeral 56 an acnode eliminating circuit for eliminating isolated data in an output signal of the non-linear processing circuit 7 (that is, data the value of which is greatly different from the values of the surrounding data), numeral 58 a field memory for delaying an output signal of the acnode eliminating circuit 56 by 263H, and numeral 57 an adder for adding an input signal and an output signal of the field memory 58. The components 5 to 7, 56, 57 and 58 show a detailed example of the construction of the motion amount detecting circuit 26 shown in FIG. 2.

The subtracter 15 produces a difference between the (n−263)th line signal and a mean value of the n-th line signal between the (n+1)th line signal. Namely, the positions at which a correlation between signals spaced from each other by one field is determined are substantially the same. Therefore, a more accurate inter-field correlation can be determined. After a level variation is eliminated by the non-linear processing circuit 55 which has a characteristic, for example, as shown in FIG. 9, the non-linear processing circuit 7 for in-field correlation is controlled. In the acnode eliminating circuit 56, peculiarly unique signals contained in the non-linear processing circuit 7 are eliminated. Thereafter, an output of the acnode eliminating circuit 56 is supplied to the adder 57 and the field memory 58. The elimination of acnodes is made taking the human's visual sensitivity to a reproduced image into consideration or since one will feel visually unnatural if a certain point is subjected to an interpolation processing which is greatly different from processings made for the other surrounding points. An output signal of the field memory 58 (a signal preceding by 263H) and an output signal of the acnode eliminating circuit 56 are added to each other in the adder 57 and an output of the adder 57 is supplied as a signal representative of the amount of motion to the mixer 23. This output signal of the adder 57 controls the mixer 23 which in turn produces an interpolation signal. The reason why the output signal of the acnode eliminating circuit 56 and the signal preceding by 263H are added in the adder 57 is that the motion amount can be accurately detected when the determination of the motion amount is made considering the motion of the signal preceding by 263H which is a signal used for the inter-field interpolation processing.

In FIG. 14, the field memory 20 is used for three purposes, that is, a purpose of determining a correlation between frames, a purpose of determining an inter-field correlation and a purpose of producing an inter-field interpolation signal. Also, the line memory 21 is used for two purposes, that is, a purpose of determining the inter-field correlation and a purpose of producing an in-field interpolation signal. Thus, the construction shown in FIG. 14 is greatly rationalized and is advantageous in realizing an interlace/non-interlace signal converting circuit at low cost.

Figure 15:
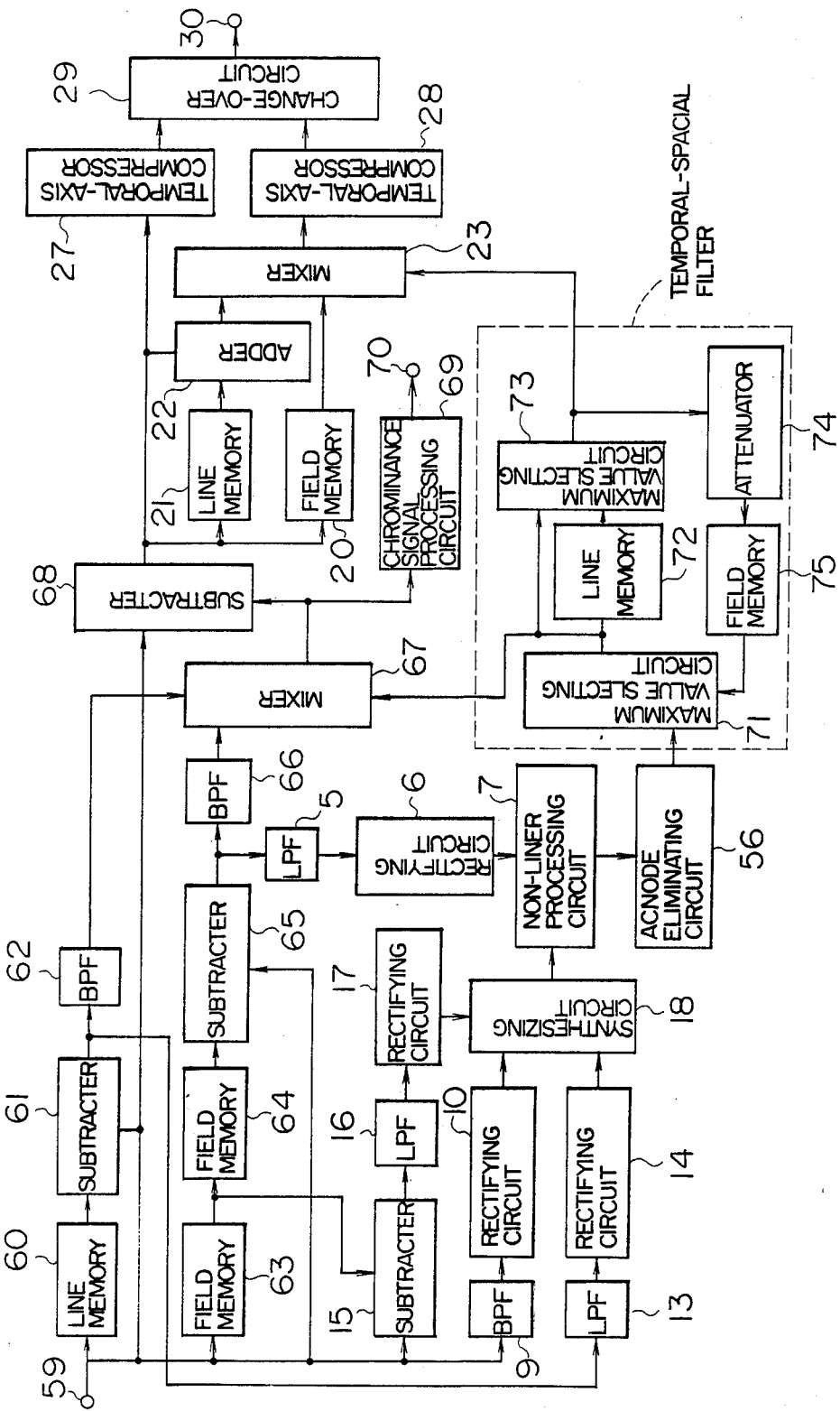
FIG. 15 is a block diagram of another embodiment of an interlace/non-interlace signal converting circuit according to the present invention.

A signal processing called IDTV (Improved Definition Television) may be considered in which the motion-adapted interlace/non-interlace conversion and a motion-adapted luminance/chrominance signal separation are combined. FIG. 15 shows an embodiment in the case where the IDTV is combined with the motion detecting circuit according to the present invention. Though the circuit shown in FIG. 15 basically includes the combination of the interlace/non-interlace signal converting circuit shown in FIG. 2 and the motion detecting circuit shown in FIG. 1, a comb-shaped filter for luminance/chrominance signal separation and a temporal-spacial filter are additionally provided.

Figure 2:
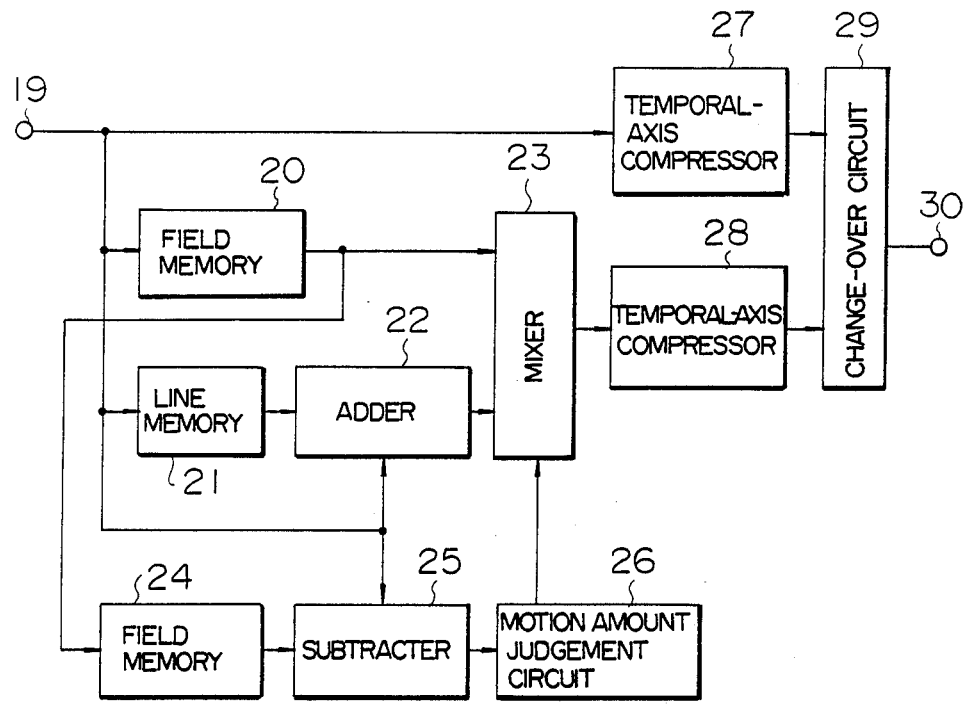
FIG. 2 is a block diagram of an interlace/noninterlace signal converting circuit to which the present invention is applied.

In FIG. 15, components 5, 6, 7, 9, 10 and 13 to 18 are the same as those shown in FIG. 1, components 20 to 23 and 27 to 30 are the same as those shown in FIG. 2 and a component 56 is the same as that shown in FIG. 14. Reference numeral 59 designates an input terminal to which a composite signal is inputted, numeral 60 a line memory for delaying an input signal by 1H, numeral 61 a line memory for delaying an input signal by 1H, numeral 61 a subtracter, numeral 62 a BPF for extracting a color subcarrier frequency band, numeral 63 a field memory for delaying an input signal by 263H, numeral 64 a field memory for further delaying an output signal of the field memory 63 by 262H, numeral 65 a subtracter, numeral 66 a BPF for extracting a component in the vicinity of the color subcarrier frequency band, numeral 67 a mixer for mixing an output of the BPF 62 and an output of the BPF 66, numeral 68 a subtracter for subtracting an output signal of the mixer 67 from the input signal supplied to the input terminal 59, numeral 69 a chrominance signal processing circuit for performing a processing for demodulation of a chrominance signal component included in the output signal of the mixer 67 and a processing for interlace/non-interlace conversion, numeral 70 an output terminal, numeral 72 a maximum value selecting circuit for selecting larger one of two input signals supplied thereto, numeral 71 a line memory for delaying an output signal of the maximum value selecting circuit 71 by 1H, numeral 73 a maximum value selecting circuit for selecting larger one of an input signal to and an output signal from the line memory 72, numeral 75 an attenuator for attenuating an output signal of the maximum value selecting circuit 73, and numeral 75 a field memory for delaying an output signal of the attenuator 74 by 263H.

The line memory 60, the subtracter 61 and the BPF 62 forms a line comb-shaped filter for in-field processing for a motion picture image portion which selects a chrominance signal. The field memory 63, the field memory 64, the subtracter 65 and the BPF 66 forms a frame comb-shaped filter for inter-frame processing for a still picture image portion. For simplification of the circuit, the field memory 63, the field memory 64 and the subtracter 65 are also used for determining an inter-frame correlation for detection of a motion and an output signal of the subtracter 65 is supplied to the maximum value selecting circuit 71 through the LPF 5, the rectifying circuit 6, the non-linear processing circuit 7 and the acnode eliminating circuit 56 so that it is converted to a signal representative of the amount of motion for controlling the mixer 23. This motion amount signal is processed by a recursive temporal-spacial filter which is formed by the maximum value selecting circuit 71, the line memory 72, the maximum value selecting circuit 73, the attenuator 74 and the field memory 75. The motion amount is expanded in an upward and downward direction of a field scanning plane by the maximum value selecting circuit 73 and in a temporal direction by the field memory 75 and the maximum value selecting circuit 71. The attenuator 74 is provided for limiting a range where the expansion extends. For example, in the attenuator 74, a certain constant is subtracted from an input signal supplied thereto or the input signal is multiplied by a coefficient smaller than 1. With such a recursive temporal-spacial filter, it becomes possible to perform controls for Y/C (luminance/chrominance) separation and scanning line interpolation while utilizing the amount of a temporarily and spacially neighboring motion. Thereby, an erroneous detection where a motion picture image is erroneously judged as being a still picture image, can be greatly reduced.

The operation and effect of the recursive temporal-spacial filter will now be explained in more detail.

It is assumed that the amount of motion is represented by 16 steps and the attenuator 74 is of a subtracter type, for example, a subtracter in which 3 is subtracted from an input supplied thereto. Now consider the case where the output of the maximum value selecting circuit 73 provides the motion amount as shown in FIG. 14. A numeral written in each of circles in FIG. 14 represents the motion amount. In the case of FIG. 14, the value of 15 being the maximum motion amount appears for the n-th line (of the k-th field). The subtracter 74 subtracts 3 from the maximum motion amount (15) to produce 12. Accordingly, for the (n+262)th line, the value of 12 which is an output of the field memory 75 is outputted from the maximum value selecting circuit 71 even if an output of the acnode eliminating circuit 75 is zero. Thus, the maximum value selecting circuit 73 outputs the value of 12 for the (n+262)th line. Since the value of 12 is further delayed by the line memory 72 by 1H (or one line), the value of 12 is also outputted for the (n+263)th line. This value of 12 is passed through the attenuator 74, the field memory 75 and the line memory 72 so that the value of 9 appears as the output of the maximum value selecting circuit 73 for three lines of the (n+524)th to (n+526)th lines. In this manner, with the provision of the temporal-spacial filter, the influence of the amount of a motion which has appeared for the n-th line of the k-th line is temporarily exerted on the successive four fields ((k+1)th to (k+4)th fields) following the k-th field This influence is spacially exerted on four upper and lower lines in a vertical direction. If the attenuator is not provided, the value of 15 remains unchanged and hence the maximum motion amount having the value of 15 are ultimately provided for all of lines.

As is apparent from the above, the amount of a motion which has occurred at a certain point exerts on several fields and several upper and lower lines of each of those fields. In other words, for a certain point is used the amount of a motion of a neighboring line which has occurred before several fields.

Figures 17A, 17B:
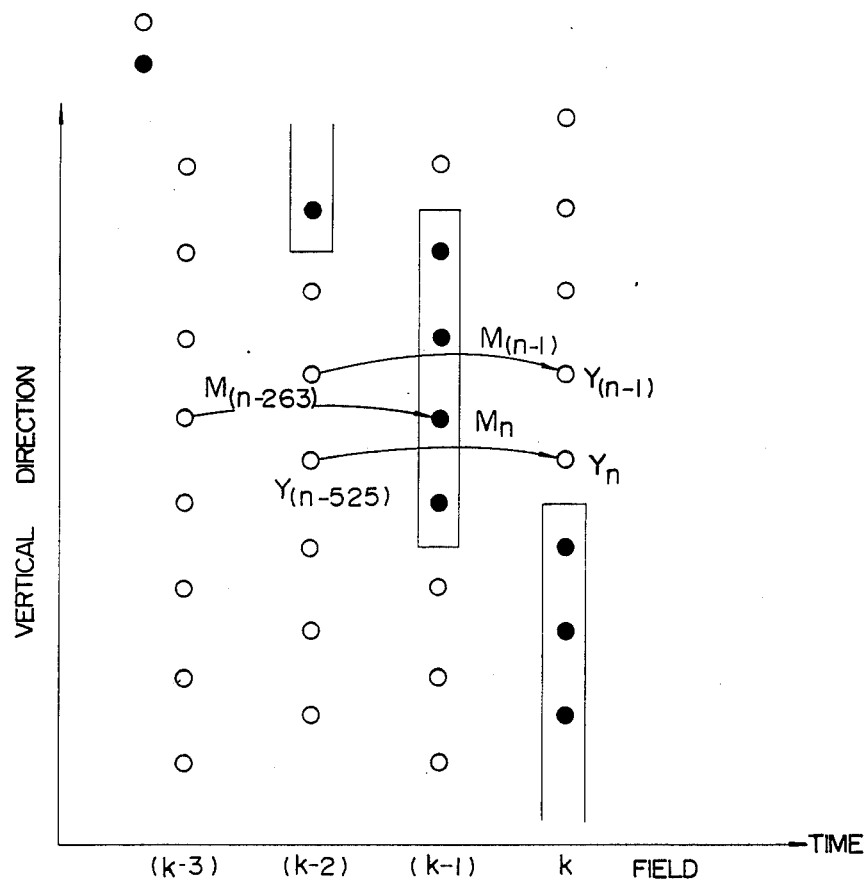

Next, the reason why erroneous detection can be prevented by utilizing the amount of the previously occurred motion will be explained. Now consider the case where a black object moves downward from above in a bright background, as shown in FIG. 17A. Then, the luminance level $Y_n$ for the n-th line in the k-th field takes the luminance level of the background portion. The luminance level $Y_{(n-525)}$ for the (n−525)th line preceding the n-th line by one frame also takes the luminance level of the background portion. Since a difference between $Y_n$ and $Y_{(n-525)}$ is nearly zero, the judgement as a stationary portion is made. Also as for the (n−1)th line which precedes the n-th line by one line, the luminance level $Y_{(n-1)}$ therefor takes the luminance level of the background portion and the luminance level $Y_{(n-526)}$ for the (n−526)th line preceding the (n−1)th line by one frame also takes the luminance level of the background portion. Since a difference between $Y_{(n-1)}$ and $Y_{(n-526)}$ is nearly zero, the judgement as a stationary portion is made. Accordingly, if any special means is not provided, an interpolation for a scanning line between the (n−1)th line and the n-th line assumes an inter-field interpolation and hence information for a scanning line (the (n−263)th line) in the preceding field will be interpolated. But, the (n−263)th line corresponds to a portion where the moving object exists. As a result, the inter-field interpolation is not convenient.

Figure 16:
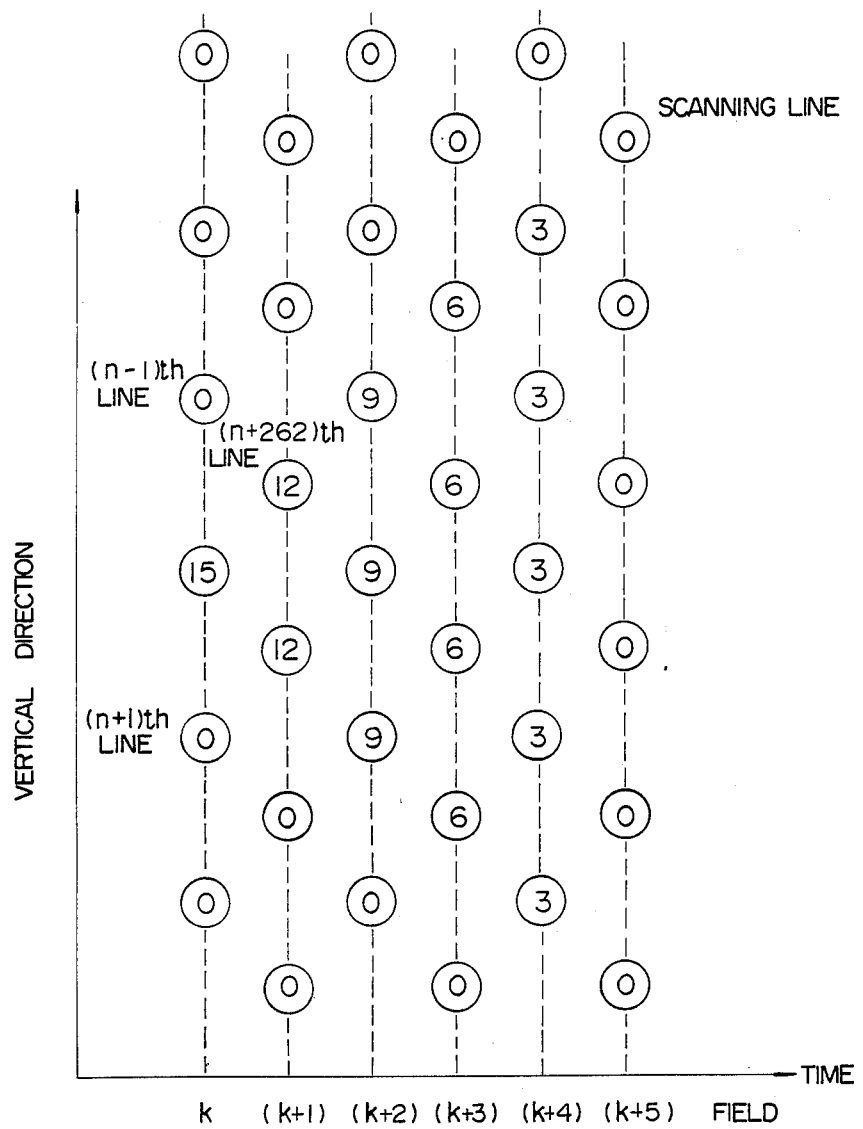
FIGS. 16, 17A and 17B are views for explaining the operation of a temporal-spacial filter in the circuit of the present invention.

However, paying attention to the (n−263)th line, the luminance level for this line is the luminance level of the moving object portion and the luminance level for the (n−788)th line preceding the (n−263)th line by one frame is the luminance level of the background portion. Therefore, an inter-frame difference at the (n−263)th line is large, thereby producing a large motion amount. The use of the temporal-spacial filter shown in FIG. 15 results in that a version of the motion amount of the (n−263)th line attenuated by the attenuator 74 to a certain degree is used at the (n−1)th line and the n-th line, as shown in FIG. 16. Accordingly, a large motion amount is obtained at the n-th line and the (n−1)th line. Therefore, an in-field interpolation is made (for example, a mean value between information for the n-th line and information for the (n−1)th line is used). As a result, remedy for an erroneous detection can be made.

Though the present invention uses means for lowering the detection sensitivity when a correlation between fields is low (or a difference between fields is large), as has been mentioned, the temporal-spacial filter is especially effective when there is an erroneous detection in a case as shown in FIG. 17A.

The Y/C separation processing and the interpolation processing are made at positions which are different from each other in a vertical direction. Corresponding thereto, control signals for the mixers 67 and 23 are derived from different positions in the temporal-spacial filter. Namely, the mixer 67 is controlled by the output signal of the maximum value selecting circuit 71 while the mixer 23 is controlled by the output signal of the maximum value selecting circuit 73.

In the present embodiment, the mixer 67 is constructed so as to change the characteristics of the comb-shaped filters in accordance with the motion of an image in such a manner that the mixer 67 delivers the output signal of the BPF 66 (i.e. the output signal of the frame comb-shaped filter) for a portion where the output of the maximum value selecting circuit 71 is zero or a portion which has a high inter-frame correlation delivers the output signal of the BPF 62 (i.e. the output signal of the line comb-shaped filter) for a portion where the output of the maximum value selecting circuit 71 is sufficiently large or a portion which can be regarded as a complete motion picture, and delivers a mixed version of the output signals of the BPF's 66 and 62 with the ratio of mixture thereof changed in accordance with the amount of a motion for a portion which is intermediate between the above-mentioned two portions. With such a construction, a chrominance signal is separated in the optimum fashion. In the subtracter 68, a chrominance signal included in the composite signal from the input terminal 59 is cancelled by the chrominance signal obtained as the output signal of the mixer 67 so that a luminance signal is taken out.

The line memory 60 and the subtracter 61 are used both for the detection of the amount of change of amplitude in the vertical direction and the line comb-shaped filter, the field memory 63 is used for three processings of the frame comb-shaped filter, the detection of the inter-frame correlation and the detection of the inter-field correlation, the field memory 64 and the subtracter 65 are used for two processings of the frame comb-shaped filter and the detection of the inter-frame correlation, and the motion detecting circuit is used both for the Y/C separation and the interlace/non-interlace conversion. Thus, the circuit construction is rationalized, thereby achieving a high performance at low cost.

As has been explained above, according to the present invention, since the sensitivity of conversion of an inter-frame correlation into the amount of a motion can be made low when the inter-frame correlation is low, there is an effect that an interlace/non-interlace converting circuit can be constructed in which any flicker which may occur upon input of a signal having a critical vertical resolution is greatly reduced.

We claim:

1. An image motion detecting circuit in a television signal processing circuit in which an interlace scanning for constructing an image for one frame through scanning of images for two fields is performed, comprising:
    inter-frame correlation detecting means for detecting and outputting the value of correlation of video signals between adjacent frames;
    inter-field correlation detecting means for detecting and outputting the value of correlation of signals of corresponding pixels between adjacent fields; and
    adjusting means for adjusting the output of said inter-frame correlation detecting means in accordance with the inter-field correlation value outputted from said inter-field correlation detecting means.

2. An image motion detecting circuit according to claim 1, further comprising outline detecting means for detecting the amount of change of amplitude in a horizontal direction for each line, in-field correlation detecting means for detecting the amount of change in amplitude between adjacent lines for each field, and synthesizing means for receiving an output of said outline detecting means, an output of said in-field correlation detecting means and the output of said inter-field correlation detecting means and synthesizing them into one composite output signal, said adjusting means adjusting the output of said inter-frame correlation detecting means in accordance with the composite output signal of said synthesizing means.

3. An image motion detecting circuit according to claim 2, wherein said synthesizing means includes a first coefficient multiplier connected to the output of said outline detecting means for multiplying the output of said outline detecting means by a predetermined coefficient, a second coefficient multiplier connected to the output of said in-field correlation detecting means for multiplying the output of said in-field correlation detecting means by a predetermined coefficient, a third coefficient multiplier connected to the output of said inter-field correlation detecting means for multiplying the output of said inter-correlation detecting means by a predetermined coefficient, a mixer for mixing outputs of said first to third coefficient multipliers, and a non-linearizing circuit for providing a non-linear characteristic to an output of said mixer to supply the non-linearized output to said adjusting means.

4. An image motion detecting circuit according to claim 2, wherein said synthesizing means includes a first non-linearizing circuit connected to the output of said outline detecting means for providing a first non-linear characteristic to the output of said outline detecting means, a second non-linearizing circuit connected to the output of said in-field correlation detecting means for providing a second non-linear characteristic to the output of said in-field correlation detecting means, a third non-linearizing circuit connected to the output of said inter-field correlation detecting means for providing a third non-linear characteristic to the output of said inter-field correlation detecting means, and a mixer circuit for mixing outputs of said first to third non-linearizing circuits into one output signal to supply it to said adjusting means.

5. An image motion detecting means according to claim 1, wherein said inter-field correlation detecting means includes means for detecting and outputting a plurality of values of correlation of signals of corresponding pixels between adjacent fields and a mixer for mixing said plurality of values of correlation into one output signal to supply it to said adjusting means.

6. An image motion detecting means according to claim 2, wherein said inter-field correlation detecting means includes means for detecting and outputting a plurality of values of correlation of signals of corresponding pixels between adjacent fields and a mixer for mixing said plurality of values of correlation into one output signal to supply it to said adjusting means.

7. An image motion detecting means according to claim 3, wherein said inter-field correlation detecting means includes means for detecting and outputting a plurality of values of correlation of signals of corresponding pixels between adjacent fields and a mixer for mixing said plurality of values of correlation into one output signal to supply it to said adjusting means.

8. An image motion detecting means according to claim 4, wherein said inter-filed correlation detecting means includes means for detecting and outputting a plurality of values of correlation of signals of corresponding pixels between adjacent fields and a mixer for mixing said plurality of values of correlation into one output signal to supply it to said adjusting means.

9. An image motion detecting circuit according to claim 1, wherein said inter-field correlation detecting means includes a smoothing circuit for smoothing a change of the inter-field correlation value and a clipping circuit for limiting the amplitude of an output of said smoothing circuit.

10. An image motion detecting circuit according to claim 2, wherein said inter-field correlation detecting means includes a smoothing circuit for smoothing a change of the inter-field correlation value and a clipping circuit for limiting the amplitude of an output of said smoothing circuit.

11. An image motion detecting circuit according to claim 3, wherein said inter-field correlation detecting means includes a smoothing circuit for smoothing a change of the inter-field correlation value and a clipping circuit for limiting the amplitude of an output of said smoothing circuit.

12. An image motion detecting circuit according to claim 4, wherein said inter-field correlation detecting means includes a smoothing circuit for smoothing a change of the inter-field correlation value and a clipping circuit for limiting the amplitude of an output of said smoothing circuit.

13. An image motion detecting circuit according to claim 2, wherein said adjusting means provides a nonlinear characteristic to the output of said adjusting means and the output of said inter-frame correlation detecting means and adjusts said non-linear characteristic in accordance with the value of said composite output signal, said non-linear characteristic being a characteristic in which the output of said adjusting means is zero when the inter-frame correlation detecting value takes a value in a range from zero to a first value, the output of said adjusting means is proportional to said inter-frame correlation value when said inter-frame correlation value takes a value in a range from said first value to a second value, and the output of said adjusting means is saturated at a constant value when said inter-frame correlation value is larger than said second value.

14. An image motion detecting circuit according to claim 3, wherein said adjusting means provides a non-linear characteristic to the output of said adjusting means and the output of said inter-frame correlation detecting means and adjusts said non-linear characteristic in accordance with the value of said composite output signal, said non-linear characteristic being a characteristic in which the output of said adjusting means is zero when the inter-frame correlation detecting value takes a value in a range from zero to a first value, the output of said adjusting means is proportional to said inter-frame correlation value when said inter-frame correlation value takes a value in a range from said first value to a second value, and the output of said adjusting means is saturated at a constant value when said inter-frame correlation value is larger than said second value.

15. An image motion detecting circuit according to claim 4, wherein said adjusting means provides a non-linear characteristic to the output of said adjusting means and the output of said inter-frame correlation detecting means and adjusts said non-linear characteristic in accordance with the value of said composite output signal, said non-linear characteristic being a characteristic in which the output of said adjusting means is zero when the inter-frame correlation detecting value takes a value in a range from zero to a first value, the output of said adjusting means is proportional to said inter-frame correlation value when said inter-frame correlation value takes a value in a range from said first value to a second value, and the output of said adjusting means is saturated at a constant value when said inter-frame correlation value is larger than said second value.

16. An interlace/non-interlace signal converting circuit in a television system, comprising:
inter-field interpolation signal producing means for receiving an interlace video signal to produce an inter-field interpolation signal therefrom;
inter-line interpolation signal producing means for receiving said interlace video signal to produce an inter-line interpolation signal in a field therefrom;
mixing means for receiving said inter-field interpolation signal and said inter-line interpolation signal and mixing them into one signal to output it;
change-over means for receiving said interlace video signal and the output of said mixing means to output them alternately for every one horizontal scanning period;
inter-frame correlation detecting means for detecting the value of correlation of video signals between adjacent frames on the basis of said interlace video signal to output the inter-frame correlation value;
inter-field correlation detecting means for detecting the value of correlation of signals of corresponding pixels between adjacent fields on the basis of said interlace video signal to output the inter-field correlation value;
adjusting means for adjusting the output of said inter-frame correlation detecting means in accordance with the inter-field correlation value outputted from said inter-field correlation detecting means; and
said mixing means including control means for controlling the ratio of mixture of said inter-field interpolation signal and said inter-line interpolation signal to each other in accordance with an output of said adjusting means.

17. An interlace/non-interlace signal converting circuit in a television system, comprising:
separating means for receiving an interlace composite video signal to separate said video signal into a chrominance signal and a luminance signal;
demodulating means for demodulating said chrominance signal;
inter-field interpolation signal producing means for receiving said interlace luminance signal to produce an inter-field interpolation signal therefrom;
inter-line interpolation signal producing means for receiving said interlace luminance signal to produce an inter-line interpolation signal in a field therefrom;
mixing means for receiving said inter-field interpolation signal and said inter-line interpolation signal and mixing them into one signal to output it;
change-over means for receiving said interlace composite video signal and the output of said mixing means to output them alternately for every one horizontal scanning period;
inter-frame correlation detecting means for detecting the value of correlation of video signals between adjacent frames on the basis of said interlace composite video signal to output the inter-frame correlation value;
inter-field correlation detecting means for detecting the value of correlation of signals of corresponding pixels between adjacent fields on the basis of said interlace composite video signal to output the inter-field correlation value;

adjusting means for adjusting the output of said inter-frame correlation detecting means in accordance with the inter-field correlation value outputted from said inter-field correlation detecting means;

a recursive temporal-spacial filter for receiving an output of said adjusting means to expanding it in an upward/downward spacial direction of a field and in a temporal direction; and said mixing means including control means for controlling the ratio of mixture of said inter-field interpolation signal and said inter-line interpolation signal to each other in accordance with an output of said temporal-spacial filter.

18. An interlace/non-interlace signal converting circuit according to claim 17, wherein said separating means includes a line comb-shaped filter corresponding to a motion picture, a frame comb-shaped filter corresponding to a still picture and a mixer for synthesizing outputs of said line and frame comb-shaped filters, said mixer including means for adjusting the ratio of mixture of the outputs of said line and frame comb-shaped filters to each other in accordance with the output of said temporal-spacial filter, an output of said mixer being supplied to said demodulating means, said interfield interpolation signal producing means and said inter-line interpolation signal producing means.

* * * * *